United States Patent
Suga et al.

(10) Patent No.: US 8,833,797 B2
(45) Date of Patent: Sep. 16, 2014

(54) AUTOMOBILE CEILING MATERIAL PROVISIONAL PLACEMENT STRUCTURE AND AUTOMOBILE CEILING MATERIAL INSTALLATION METHOD

(75) Inventors: Hitoshi Suga, Nagoya (JP); Yoshifumi Abeta, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/005,342

(22) PCT Filed: May 2, 2011

(86) PCT No.: PCT/JP2011/060555
§ 371 (c)(1),
(2), (4) Date: Sep. 16, 2013

(87) PCT Pub. No.: WO2012/150634
PCT Pub. Date: Nov. 8, 2012

(65) Prior Publication Data
US 2014/0042734 A1   Feb. 13, 2014

(51) Int. Cl.
*B60R 21/213* (2011.01)
*B60R 21/217* (2011.01)
*B60R 13/02* (2006.01)
*B60R 21/214* (2011.01)

(52) U.S. Cl.
CPC ............ *B60R 21/214* (2013.01); *B60R 13/0206* (2013.01); *B60R 21/2171* (2013.01); *B60R 13/0212* (2013.01); *B60R 21/213* (2013.01)
USPC ..................................... 280/728.2; 280/730.2

(58) Field of Classification Search
USPC ........................................... 280/728.2, 730.2
See application file for complete search history.

(56) References Cited

U.S. PATENT DOCUMENTS

| | | | | |
|---|---|---|---|---|
| 5,215,330 A | * | 6/1993 | Kurita | 280/728.3 |
| 5,941,558 A | * | 8/1999 | Labrie et al. | 280/728.3 |
| 6,955,376 B1 | * | 10/2005 | Labrie et al. | 280/728.3 |
| 8,096,574 B2 | * | 1/2012 | Okimoto et al. | 280/728.2 |
| 2003/0001365 A1 | * | 1/2003 | Ochiai et al. | 280/730.2 |
| 2005/0057078 A1 | | 3/2005 | Huijer | |
| 2006/0082108 A1 | * | 4/2006 | Wahara et al. | 280/730.2 |
| 2006/0267315 A1 | * | 11/2006 | White | 280/730.2 |
| 2007/0296185 A1 | * | 12/2007 | Hidaka et al. | 280/728.2 |
| 2009/0091105 A1 | | 4/2009 | Okimoto et al. | |

FOREIGN PATENT DOCUMENTS

| | | |
|---|---|---|
| EP | 1 223 084 A2 | 7/2002 |
| EP | 1 925 510 A2 | 5/2008 |
| EP | 2 151 360 A1 | 2/2010 |

(Continued)

*Primary Examiner* — Drew Brown
(74) *Attorney, Agent, or Firm* — Oliff PLC (57) ABSTRACT

To obtain an automobile ceiling material provisional placement structure and an automobile ceiling material installation method in which it is not necessary to set dedicated receiving portions for provisionally placing a ceiling material and with which the degree of freedom of setting positions of receiving portions can be improved. In an automobile ceiling material provisional placement structure, receiving portions for provisionally placing a roof headlining are disposed on existing resin covers covering curtain airbags, so it is not necessary to dispose dedicated receiving portions. Therefore, an increase in cost can be suppressed. Moreover, resin covers are formed in long shapes along roof side rails, so the degree of freedom of the setting positions of the receiving portions disposed on the resin covers can be improved. Therefore, workability when installing the roof headlining in a vehicle body can be improved.

7 Claims, 8 Drawing Sheets

(56) References Cited

FOREIGN PATENT DOCUMENTS

| JP | A-11-1147 | 1/1999 |
| JP | A-11-268666 | 10/1999 |
| JP | A-2001-206158 | 7/2001 |
| JP | A-2002-362248 | 12/2002 |
| JP | A-2003-137038 | 5/2003 |
| JP | A-2003-291768 | 10/2003 |
| JP | A-2005-69248 | 3/2005 |
| JP | A-2006-256375 | 9/2006 |
| JP | A-2009-90709 | 4/2009 |

* cited by examiner

AUTOMOBILE CEILING MATERIAL PROVISIONAL PLACEMENT STRUCTURE AND AUTOMOBILE CEILING MATERIAL INSTALLATION METHOD

TECHNICAL FIELD

The present invention relates to a provisional placement structure for provisionally placing a ceiling material for an automobile in a vehicle body when installing the ceiling material in the vehicle body and an installation method for installing a ceiling material for an automobile in a vehicle body.

BACKGROUND ART

In patent citation 1 listed below, there is disclosed a structure where, when installing a roof trim (ceiling material) in a vehicle body, locking pieces disposed projecting on the roof trim are provisionally placed on trim provisional holding flanges (receiving portions) disposed projecting on center pillar portions.

In patent citation 2 listed below, there is disclosed a structure where, by provisionally fastening provisional fastening clips disposed separately from accessories on a roof trim to provisional fastening receiving portions formed on a ceiling surface of a vehicle body, workability when installing the roof trim is improved.

In patent citation 3 listed below, there is disclosed a structure where a molded ceiling is caught and provisionally placed in cutout holes (receiving portions) disposed in side impact shock absorbing ribs disposed along roof sides.

In patent citation 4 listed below, there is disclosed a structure where ducts having integrally molded provisional placement claws are integrally disposed on a reverse surface of a ceiling material and the provisional placement claws are provisionally placed utilizing placement receiving portions disposed on attachment brackets of assist grips.

Patent Citation 1: Japanese Patent Application Laid-Open (JP-A) No. H11-001147
Patent Citation 2: JP-A No. 2001-206158
Patent Citation 3: JP-A No. 2003-137038
Patent Citation 4: JP-A No. 2006-256375

DISCLOSURE OF INVENTION

Technical Problem

However, in the structures described in patent citations 1 and 2, it is necessarily to set dedicated receiving portions for provisionally placing (provisionally fastening) the ceiling material, which leads to high costs.

Further, the structures described in patent citations 3 and 4 are configurations that utilize shock absorbing ribs and assist grip attachment brackets, so the setting positions of the receiving portions for provisionally placing the ceiling material are restricted. Consequently, there is room for improvement in terms of workability when installing the ceiling material.

In consideration of the above circumstances, it is an object of the present invention to obtain an automobile ceiling material provisional placement structure and an automobile ceiling material installation method in which it is not necessary to set dedicated receiving portions for provisionally placing a ceiling material and with which the degree of freedom of setting positions of receiving portions can be improved.

Solution to Problem

An automobile ceiling material provisional placement structure pertaining to the invention according to the first aspect comprises: a ceiling material that configures a lining of a ceiling of a passenger compartment; curtain airbags that are disposed between roof side rails of a vehicle body and the ceiling material in a state in which the curtain airbags are folded in long shapes along the roof side rails, with the curtain airbags inflating upon being supplied with gas generated by inflators, whereby the curtain airbags deploy downward while bending vehicle width direction end sides of the ceiling material; and resin covers that are formed in long shapes along the roof side rails, are disposed between the roof side rails and the curtain airbags, cover the curtain airbags in the folded state from the roof side rail sides, and have disposed thereon receiving portions capable of provisionally placing vehicle width direction end portions of the ceiling material when the ceiling material is installed in the vehicle body.

In the automobile ceiling material provisional placement structure according to the first aspect, the receiving portions for provisionally placing the ceiling material are disposed on the existing resin covers covering the curtain airbags, so it is not necessary to dispose dedicated receiving portions. Because of this, for example, an increase in cost can be suppressed. Moreover, the resin covers are formed in long shapes along the roof side rails, so the degree of freedom of the setting positions of the receiving portions disposed on the resin covers can be improved. Because of this, for example, workability when installing the ceiling material in the vehicle body can be improved.

An automobile ceiling material provisional placement structure pertaining to the invention according to the second aspect is the automobile ceiling material provisional placement structure according to the first aspect, wherein the receiving portions are disposed on vehicle rear side end portions of the resin covers.

In the automobile ceiling material provisional placement structure according to the second aspect, the rear end side of the ceiling material can be provisionally placed on the receiving portions disposed on the vehicle rear side end portions of the resin covers. In this state, when the front end side of the ceiling material is locked to the vehicle body by clips or the like, the ceiling material becomes supported substantially horizontally with respect to the vehicle body. Because of this, the work of attaching sun visors and assist grips to the vehicle body thereafter—that is, the work of securing the ceiling material to the vehicle body using these members—can be made easy.

An automobile ceiling material provisional placement structure pertaining to the invention according to the third aspect is the automobile ceiling material provisional placement structure according to the first aspect or the second aspect, wherein the receiving portions are disposed on vehicle rear sides of vehicle rear side end portions of the curtain airbags in the folded state.

In the automobile ceiling material provisional placement structure according to the third aspect, the receiving portions of the resin covers are disposed on the vehicle rear sides of the vehicle rear side end portions of the curtain airbags in the folded state, so the curtain airbags that inflate and deploy downward do not interfere with the receiving portions, which is preferred.

An automobile ceiling material provisional placement structure pertaining to the invention according to the fourth aspect is the automobile ceiling material provisional placement structure according to any one of the first aspect to the third aspect, wherein the receiving portions are disposed in proximity to securing portions for securing the resin covers to the roof side rails.

In the automobile ceiling material provisional placement structure according to the fourth aspect, the receiving portions of the resin covers are disposed in proximity to the securing portions for securing the resin covers to the roof side rails. Because of this, when the ceiling material has been provisionally placed on the receiving portions, the mass of the ceiling material can be supported well by the roof side rails while suppressing deformation of the resin covers.

An automobile ceiling material provisional placement structure pertaining to the invention according to the fifth aspect is the automobile ceiling material provisional placement structure according to any one of the first aspect to the fourth aspect, wherein the receiving portions extend downward from vehicle width direction outside sections of cover bodies of the resin covers covering the curtain airbags, provisional placement claws projecting inward in the vehicle width direction are disposed on lower end sides of the receiving portions, and the vehicle width direction end portions of the ceiling material are provisionally placed on upper surfaces of the provisional placement claws.

In the automobile ceiling material provisional placement structure according to the fifth aspect, the receiving portions extend downward from the vehicle width direction outside sections (that is, the sections on the roof side rail sides) of the cover bodies of the resin covers attached to the roof side rails. Additionally, the vehicle width direction end portions of the ceiling material are provisionally placed on the upper surfaces of the provisional placement claws disposed on the lower end sides of the receiving portions. Because of this, spaces for disposing the receiving portions can be easily ensured in the limited spaces between the roof side rails and the ceiling material.

An automobile ceiling material provisional placement structure pertaining to the invention according to the sixth aspect is the automobile ceiling material provisional placement structure according to any one of the first aspect to the fifth aspect, wherein vehicle width direction outside end portions of the receiving portions are in contact with the roof side rails.

In the automobile ceiling material provisional placement structure according to the sixth aspect, the vehicle width direction outside end portions of the receiving portions are in contact with the roof side rails. Because of this, when the ceiling material has been provisionally placed on the receiving portions, the receiving portions can be prevented or suppressed from deforming toward the roof side rails. Consequently, by moderately weakening the receiving portions, it becomes possible to reduce the weight of the receiving portions.

An automobile ceiling material provisional placement structure pertaining to the invention according to the seventh aspect is the automobile ceiling material provisional placement structure according to the fifth aspect, wherein vehicle width direction inside end portions of the provisional placement claws are made to serve as guide portions obliquely inclined downward and outward in the vehicle width direction.

In the automobile ceiling material provisional placement structure according to the seventh aspect, the vehicle width direction inside end portions of the provisional placement claws disposed on the receiving portions of the resin covers are made to serve as the guide portions inclined upward and inward in the vehicle width direction. For this reason, when provisionally placing the ceiling material on the upper surfaces of the provisional placement claws, the vehicle width direction end portions of the ceiling material can be guided to the upper surfaces of the provisional placement claws by allowing the vehicle width direction outside end portions of the ceiling material to slide against the guide portions. That is, even if the direction in which the ceiling material is lifted up varies somewhat, the lift-up direction of the ceiling material can be guided by the guide portions, so the work of provisionally placing the ceiling material can be made easy.

An automobile ceiling material provisional placement structure pertaining to the invention according to the eighth aspect is the automobile ceiling material provisional placement structure according to the fourth aspect, wherein the receiving portions are disposed below the securing portions.

In the automobile ceiling material provisional placement structure according to the eighth aspect, the receiving portions of the resin covers are disposed below the securing portions for securing the resin covers to the roof side rails. Because of this, deformation of the resin covers when the ceiling material has been provisionally placed on the receiving portions can be kept to a minimum, so by moderately weakening the sections of the resin covers between the receiving portions and the securing portions, the weight of the resin covers can be reduced.

An automobile ceiling material installation method pertaining to the invention according to the ninth aspect comprises: attaching long resin covers covering curtain airbags folded in long shapes to roof side rails; thereafter provisionally placing vehicle width direction end portions of a ceiling material of a passenger compartment on receiving portions disposed on the resin covers; and securing the ceiling material to a vehicle body via plural vehicular parts including sun visor brackets and assist grips in the provisionally placed state.

In the automobile ceiling material installation method according to the ninth aspect, the receiving portions for provisionally placing the ceiling material are disposed on the existing resin covers covering the curtain airbags, so it is not necessary to dispose dedicated receiving portions. Because of this, for example, an increase in cost can be suppressed. Moreover, the resin covers are formed in long shapes along the roof side rails, so the degree of freedom of the setting positions of the receiving portions disposed on the resin covers can be improved. Because of this, for example, workability when installing the ceiling material in the vehicle body can be improved.

Advantageous Effects of Inventions

As described above, with the automobile ceiling material provisional placement structure and the automobile ceiling material installation method pertaining to the present invention, it is not necessary to set dedicated receiving portions for provisionally placing a ceiling material and the degree of freedom of setting positions of receiving portions can be improved.

BEST MODE FOR CARRYING OUT THE INVENTION

An automobile ceiling material provisional placement structure 10 and an automobile ceiling material installation method pertaining to an embodiment of the present invention will be described below using FIG. 1 to FIG. 9. In the drawings, arrow FR denotes a vehicle front direction, arrow UP denotes a vehicle up direction, and arrow IN denotes inward in a width direction width direction.

Figure 1:
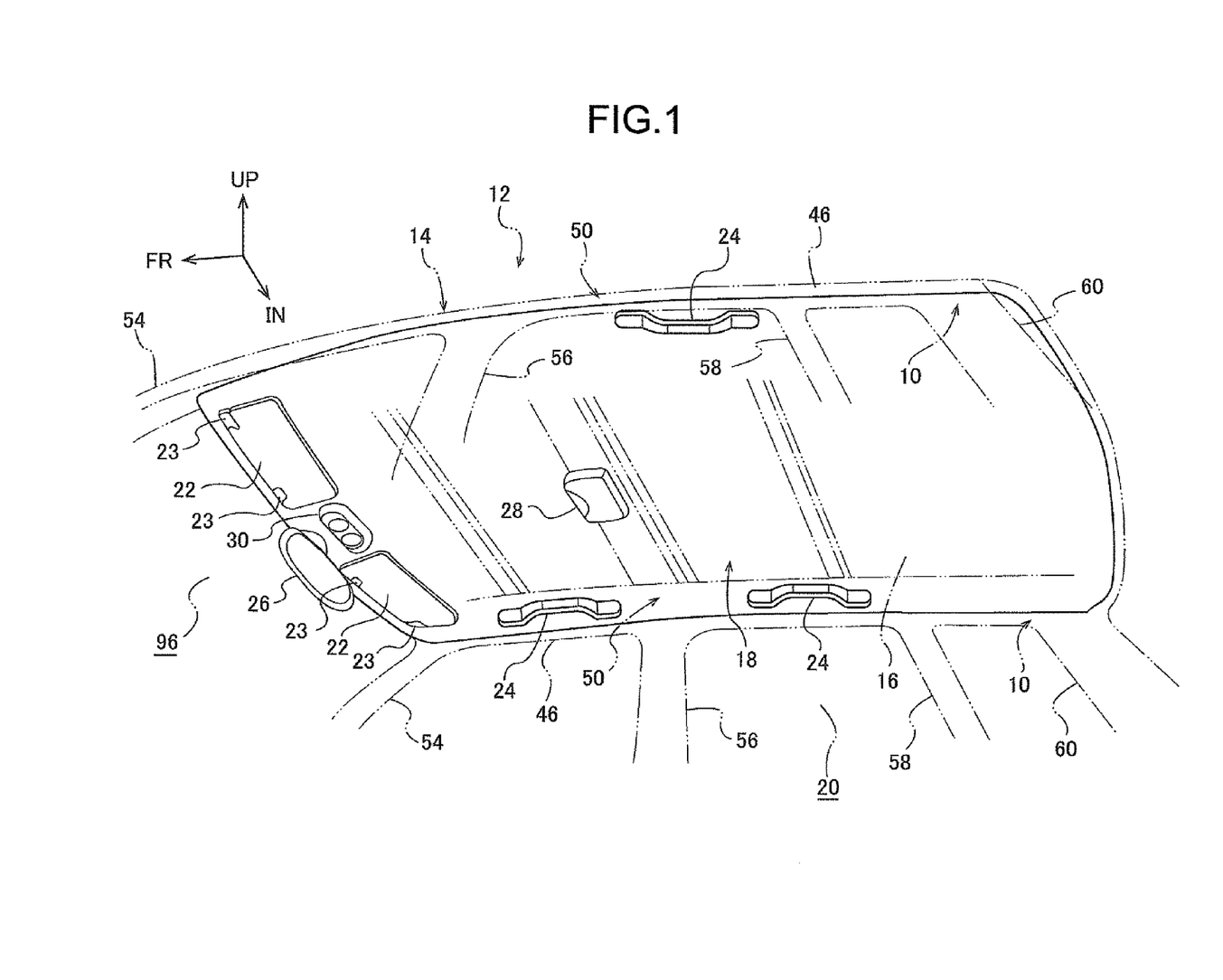
FIG. 1 is a perspective view showing the configuration of a ceiling side of a passenger compartment in an automobile to which an automobile ceiling material provisional placement structure pertaining to an embodiment of the present invention has been applied.

As shown in FIG. 1, in an automobile 12 pertaining to the present embodiment, a roof 16 of a vehicle body 14 is covered from a passenger compartment 20 side by a roof headlining 18 that is a ceiling material. The roof headlining 18 has a laminate structure in which a cover material comprising cloth is stuck to the surface of a core material comprising a resin material, for example, and the roof headlining 18 is molded and trim cut to a shape corresponding to the roof 16.

Figure 2:
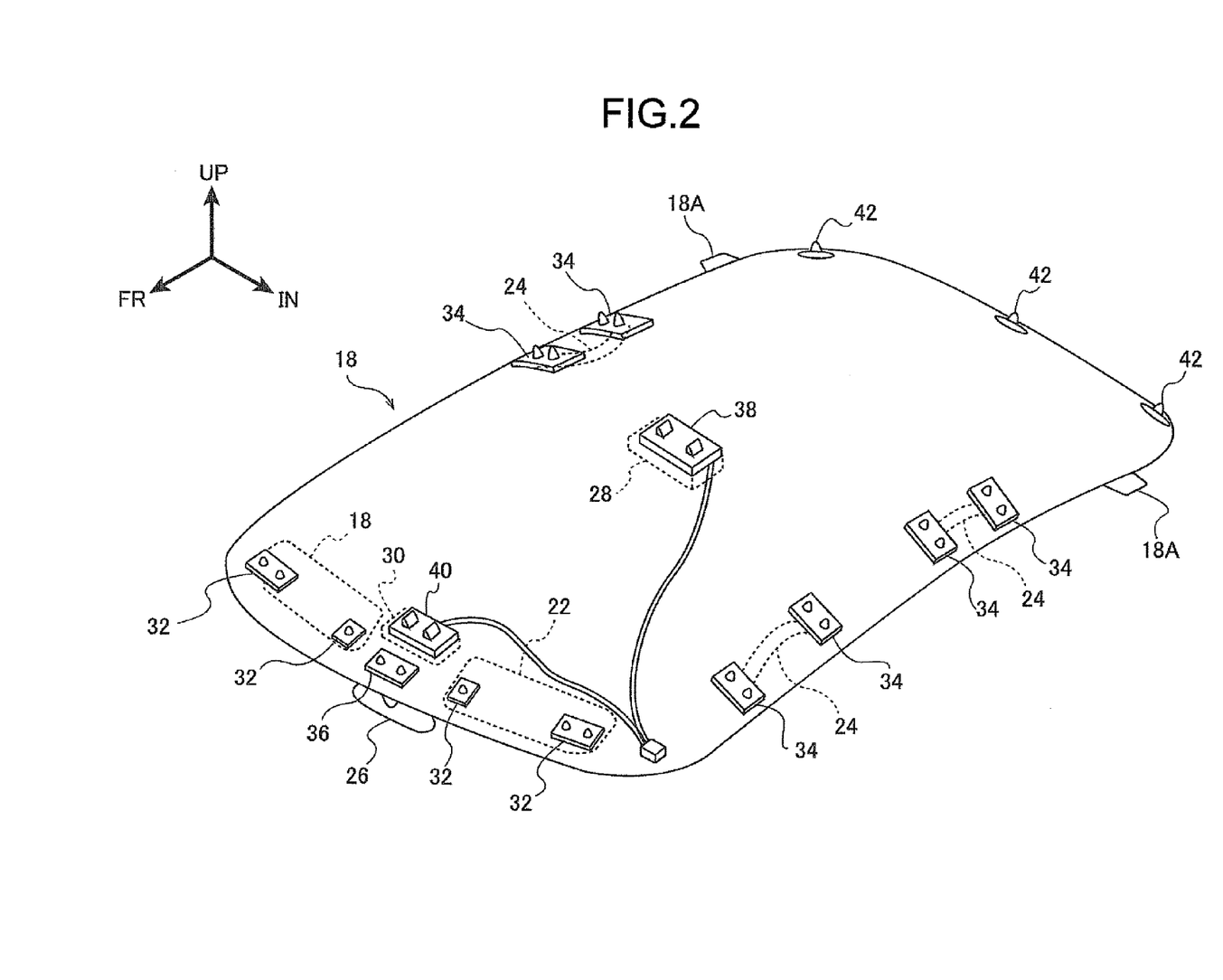
FIG. 2 is a perspective view showing the configuration of a reverse side (an upper surface side) of a roof headlining shown in FIG. 1.

As shown in FIG. 2, clips 32, 34, 36, 38, and 40 are mounted on the reverse surface side of the roof headlining 18 in positions corresponding to accessories (vehicular parts) such as sun visors 22, assist grips 24, a rearview mirror 26, a passenger compartment central light 28, and a front seat illumination light 30. Further, plural clips 42 are lined up in the vehicle width direction and mounted on the vehicle rear side end portion of the roof headlining 18. These clips 32, 34, 36, 38, 40, and 42 are pushed into and locked in non-illustrated locking holes disposed in the roof 16 and in roof side rails 46. Moreover, the accessories are fastened to the roof 16 and the roof side rails 46 by non-illustrated fasteners (screws, bolts, etc.), whereby the roof headlining 18 is secured to the vehicle body 14 together with the accessories.

As shown in FIGS. 3 and 5 to 9, curtain airbag devices 50 are disposed between the roof side rails 46 of the vehicle body 14 and the roof headlining 18. The curtain airbag devices 50 are disposed on both the right and left sides of the vehicle body, and other than the fact that they are bilaterally symmetrically formed, the curtain airbag devices 50 are given basically the same configuration, so here the configuration of the vehicle body right side will be described and description in regard to the configuration of the vehicle body left side will be omitted.

The curtain airbag devices 50 have curtain airbags 52. The curtain airbags 52 are disposed between the roof side rails 46 and the roof headlining 18 in a state in which the curtain airbags 52 have been folded into long shapes along the roof side rails 46 by what is called rolling, for example. The front end portions of the curtain airbags 52 are disposed in the neighborhoods of A-pillars 54 (see FIG. 1) of the vehicle body 14, and the rear end portions of the curtain airbags 52 are disposed between C-pillars 58 and D-pillars 60 of the vehicle body 14.

Non-illustrated inflators secured to the roof side rails 46 in the vicinities of B-pillars 56 (see FIG. 1) of the vehicle body 14 are connected to the curtain airbags 52, and the curtain airbags 52 inflate upon being supplied with gas generated by the inflators. Because of this, the curtain airbags 52 deploy downward along the side portions of the passenger compartment 20 while bending the vehicle width direction end sides of the roof headlining 18.

Resin covers 62 formed by a resin material are disposed between the curtain airbags 52 and the roof side rails 46. The resin covers 62 have cover bodies 64 formed in long shapes along the roof side rails 46. The cover bodies 64 are formed in cross-sectional C shapes having open portions 66 (see FIG. 3 and FIG. 4) disposed in their vehicle width direction inner sides, and the cover bodies 64 partially cover (house inside) the curtain airbags 52 in the folded state from the roof side rail 46 sides. For this reason, when the inflators have been actuated, the curtain airbags 52 inflate and deploy via the open portions 66 as the cover bodies 64 are subjected to a deployment reaction force of the curtain airbags 52. Because of this, interference between the curtain airbags 52 and the roof side rails 46 is prevented and the curtain airbags 52 are protected.

Figure 8:
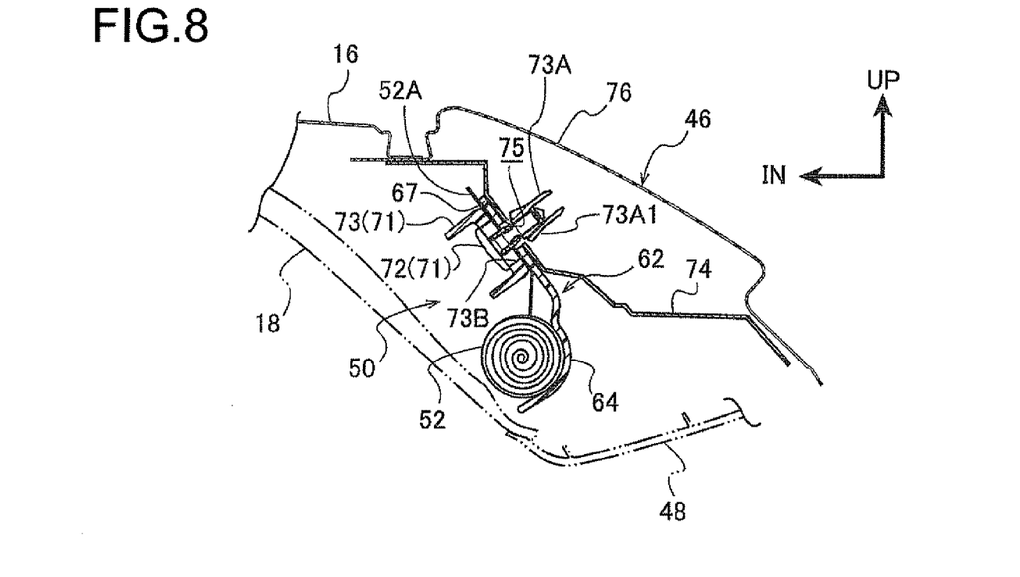
FIG. 8 is an enlarged longitudinal sectional view showing a cross section cut along line 8-8 of FIG. 4.

Plural securing portions including securing portions 67 and 68 are lined up in the vehicle front-and-rear direction and disposed on the upper portions of the cover bodies 64. These securing portions project upward from the cover bodies 64. As shown in FIG. 8, attachment pieces 52A disposed on the curtain airbags 52 are superposed on the vehicle width direction inner sides of the securing portions 67, and the attachment pieces 52A are locked together with the securing portions 67 by clips 71 to inner panels 74 of the roof side rails 46. The clips 71 are configured by pins 72 and bushes 73. The bushes 73 have tubular portions 73A, which penetrate the securing portions 67, the attachment pieces 52A, and the inner panels 74, and flange portions 73B, which are formed integrally with the tubular portions 73A, and plural elastic locking pieces 73A1 that elastically project outward in the radial direction of the tubular portions 73A are disposed on the side surfaces of the tubular portions 73A. When the tubular portions 73A are inserted into through holes 75 in the inner panels 74, these elastic locking pieces 73A1 allow the insertion by elastically deforming inward in the radial direction of the tubular portions 73A, and in a state in which the pins 72 have been inserted inside the tubular portions 73A, the elastic deformation of the elastic locking pieces 73A1 inward in the radial direction of the tubular portions 73A is prevented. In this state, the elastic locking pieces 73A1 catch on the hole edge portions of the through holes 75, whereby the tubular portions are prevented from slipping out of the through holes 75, and the attachment pieces 52A and the securing portions 67 are held (secured) between the flange portions 73B and the inner panels 74. This securing structure is also the same for the securing portions 68 and other securing portions, whereby the resin covers 62 are secured together with the curtain airbags 52 to the roof side rails 46.

Figure 3:
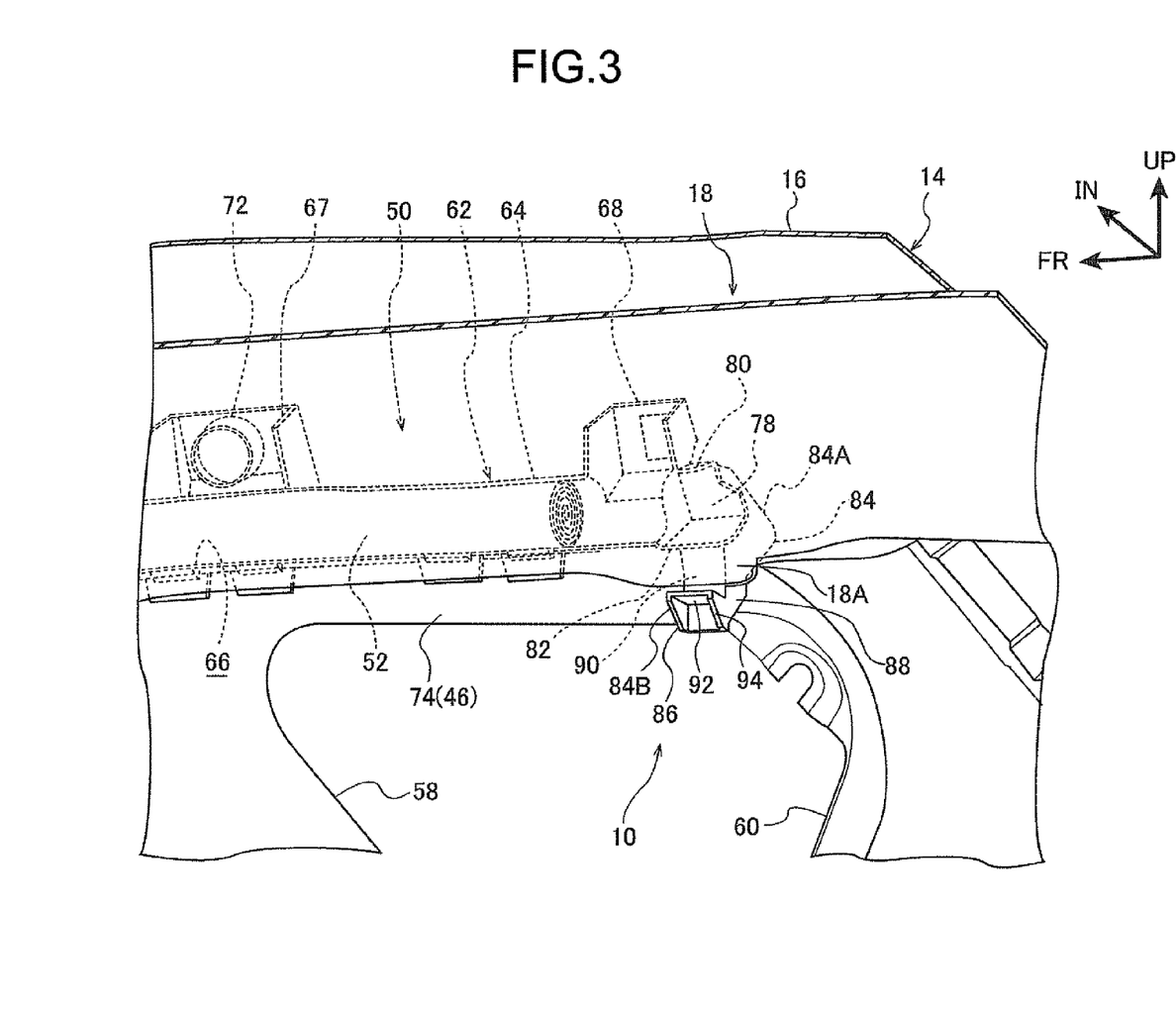
FIG. 3 is a perspective view showing the configuration of a vehicle rear end side including a rear end portion of a curtain airbag device pertaining to the embodiment of the present invention.
Figure 4:
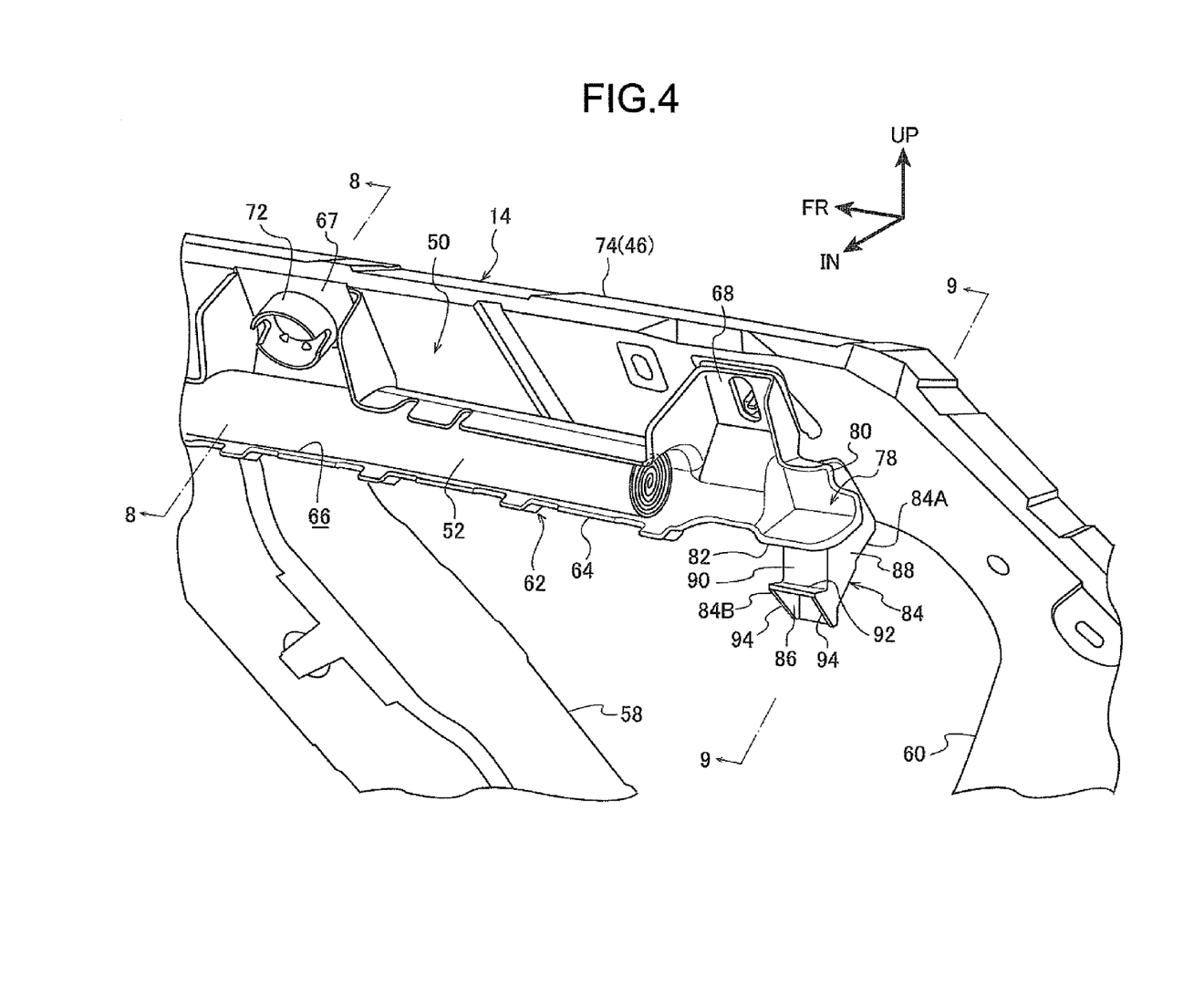
FIG. 4 is a perspective view showing, with a ceiling material being omitted, the configuration of the vehicle rear end side including the rear end portion of the curtain airbag device pertaining to the embodiment of the present invention.

In FIG. 3 and FIG. 4, for convenience of description, clips for securing the securing portions 68 to the roof side rails 46 are not illustrated. Further, in FIG. 8 and FIG. 9, 76 denotes an outer panel of the roof side rail 46. Further, the cover bodies 64 are longitudinally divided in two, and their front portions and rear portions are coupled together via the curtain airbags 52 in the folded state. That is, the curtain airbags 52 are not covered by the cover bodies 64 at the divided portions, and the cover bodies 64 are bendable at the divided portions. Because of this, the work of carrying the curtain airbag devices 50 into the passenger compartment 20 becomes easy.

As shown in FIG. 3 to FIG. 7, the vehicle rear side end portions of the cover bodies 64 are disposed in the neighborhoods of the D-pillars 60 of the vehicle body 14, and reinforcement portions 78 formed like shelves are integrally disposed on the vehicle rear side end portions of the cover bodies 64. The reinforcement portions 78 are disposed in proximity (adjacent) to the securing portions 68 disposed on the vehicle rear side end portions of the cover bodies 64 and configure part of the cover bodies 64. The reinforcement portions 78 have vertical walls 80, which extend substantially in the vehicle up-and-down direction, and lower walls 82, which integrally project from the lower ends of the vertical walls 80 inward in the vehicle width direction and somewhat obliquely downward, so that the reinforcement portions 78 are formed in cross-sectional L shapes as seen from the vehicle front-and-rear direction. Receiving portions 84 for provisionally placing the roof headlining 18 are integrally connected to the reinforcement portions 78.

The receiving portions 84 are disposed on the vehicle rear sides of the vehicle rear side end portions of the curtain airbags 52—that is, in the regions of the cover bodies 64 of the resin covers 62 where the curtain airbags 52 are not housed—and are disposed in proximity to the vehicle rear sides of the securing portions 68. The receiving portions 84 have body portions 84A, which integrally extend from the vehicle width direction outside sections of the reinforcement portions 78 outward in the vehicle width direction and downward, and provisional placement claws 8413, which extend from the lower end portions of the body portions 84A inward in the vehicle width direction. The receiving portions 84 will be described in detail below.

Figure 5:
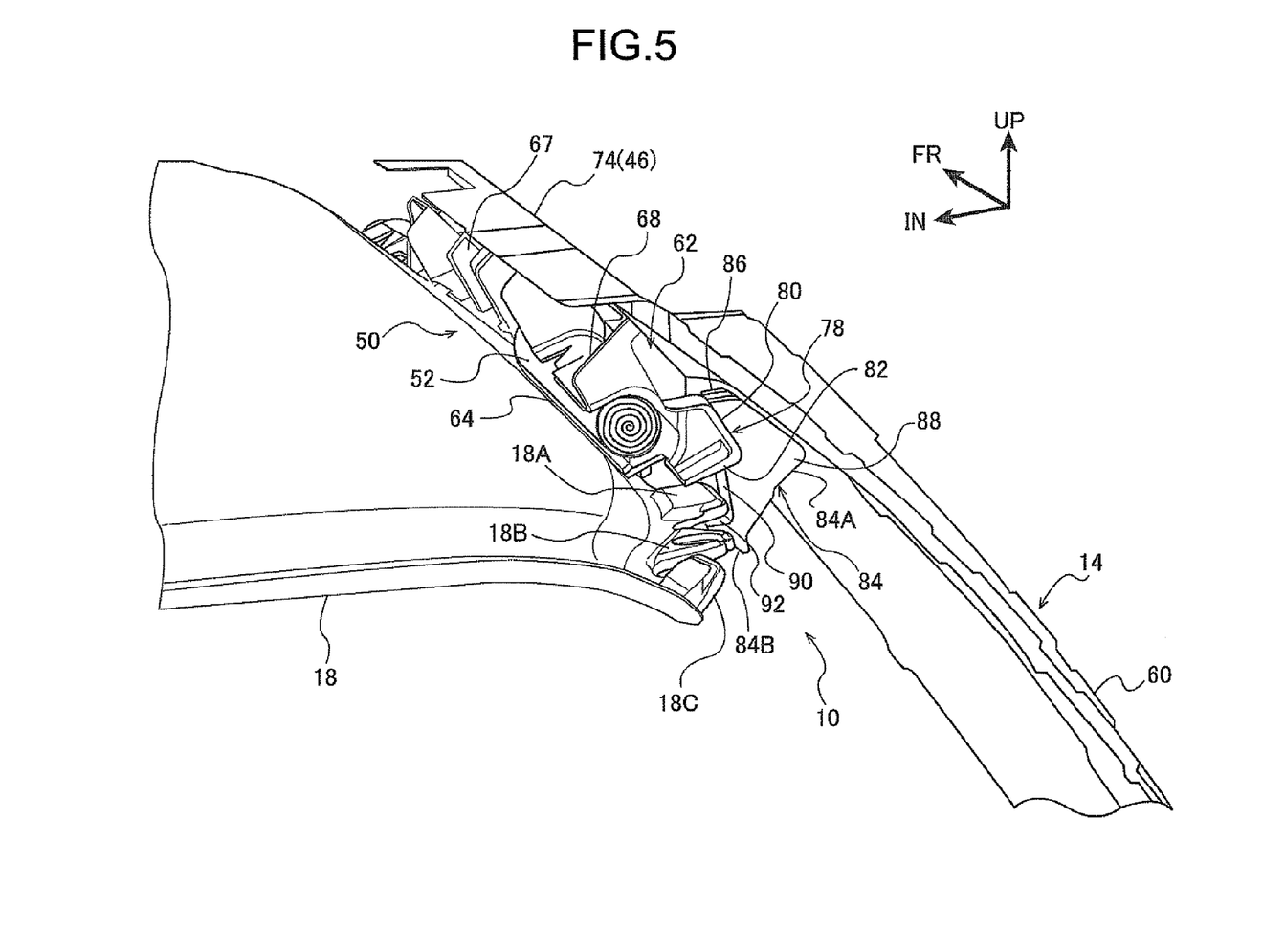
FIG. 5 is a perspective view showing, as seen obliquely from above in a vehicle rear direction, the configuration of the vehicle rear end side including the rear end portion of the curtain airbag device pertaining to the embodiment of the present invention.
Figure 6:
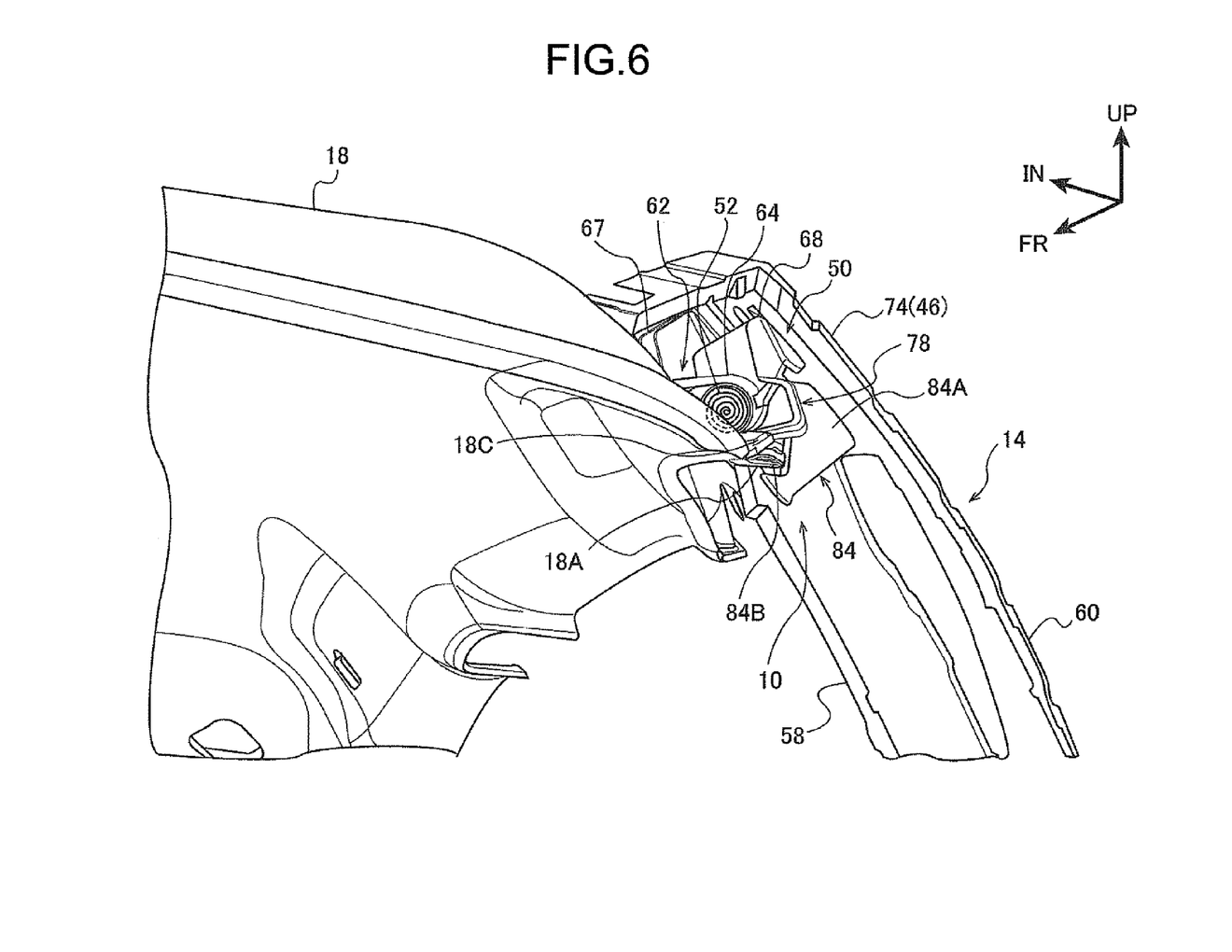
FIG. 6 is a perspective view showing, as seen obliquely from below in the vehicle rear direction, the configuration of the vehicle rear end side including the rear end portion of the curtain airbag device pertaining to the embodiment of the present invention.
Figure 7:
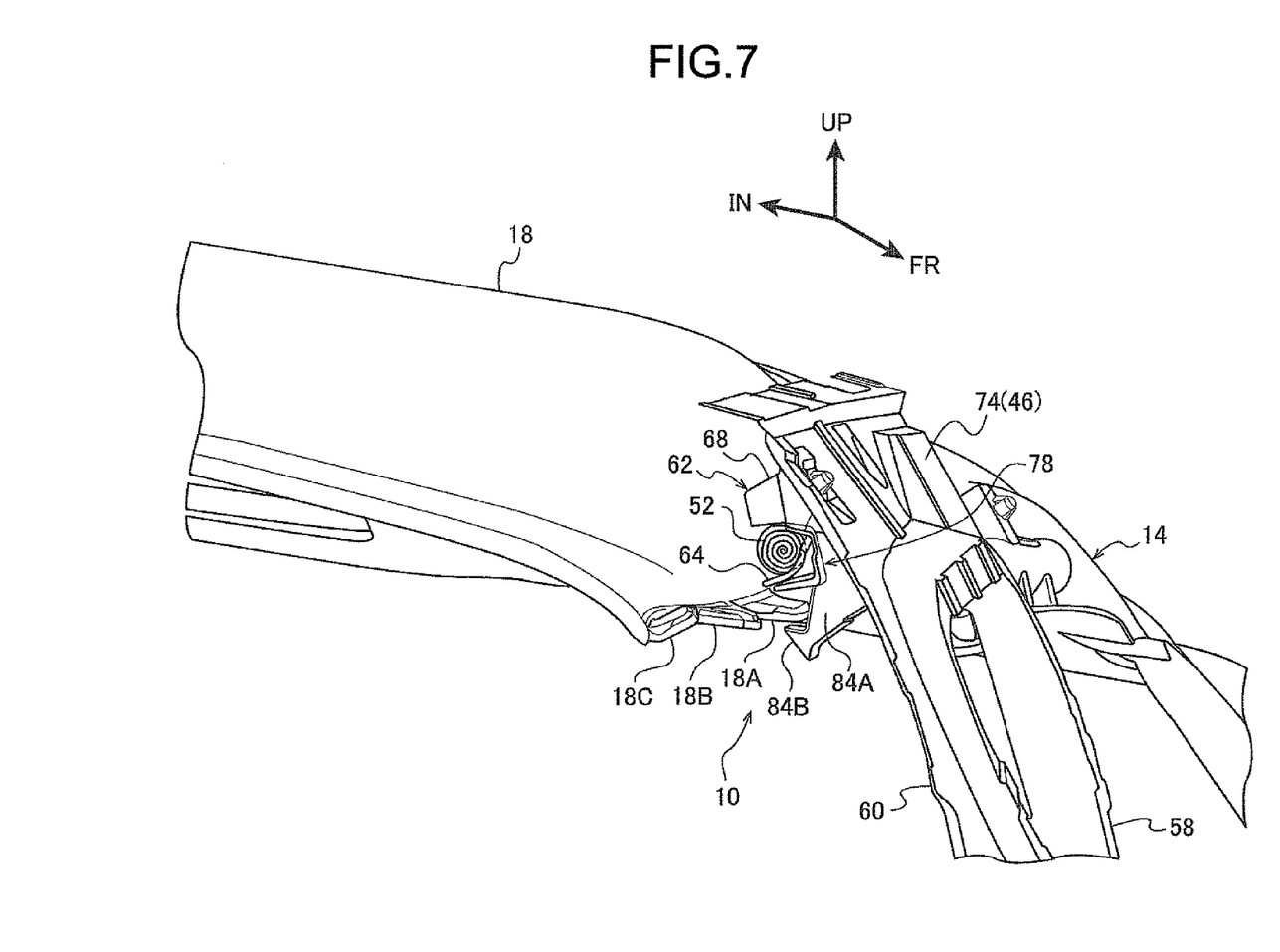
FIG. 7 is a perspective view showing, as seen obliquely from the right in the vehicle rear direction, the configuration of the vehicle rear end side including the rear end portion of the curtain airbag device pertaining to the embodiment of the present invention.

As shown in FIG. 5, the body portions 84A have front walls 86 and rear walls 88 formed in substantially triangular shapes as seen from the vehicle front-and-rear direction. The upper portions of the front walls 86 and rear walls 88 are disposed between the reinforcement portions 78 and the roof side rails 46, and the vehicle width direction inside end portions of the upper portions of the front walls 86 and rear walls 88 are integrally connected to the vehicle width direction outside surfaces of the vertical walls 80 of the reinforcement portions 78 and the vehicle width direction outside sections of the undersurfaces of the lower walls 82 of the reinforcement portions 78. Further, the vehicle width direction outside end portions of the upper portions of the front walls 86 and rear walls 88 are inclined along the inner panels 74 of the roof side rails 46 and are in contact with the inner panels 74.

The lower portions of the front walls 86 and rear walls 88 are formed in such a way that their dimension along the vehicle width direction becomes smaller toward their lower end sides, and the vehicle width direction inside end portions of the lower portions of the front walls 86 and rear walls 88 are integrally coupled together in the vehicle front-and-rear direction by inner walls 90. Because of this, the body portions 84A are formed in cross-sectional substantial U shapes whose vehicle width direction outer sides are open as seen from the vehicle up-and-down direction. The inner walls 90 are disposed substantially along the vehicle up-and-down direction, and the upper end portions of the inner walls 90 are integrally connected to the undersurfaces of the lower walls 82 of the reinforcement portions 78 (see FIG. 9).

As shown in FIG. 4, the provisional placement claws 84B are formed as a result of the lower end portions of the front walls 86 and rear walls 88 projecting further inward in the vehicle width direction than the inner walls 90 and the upper ends of those projecting sections being integrally coupled together by horizontal walls 92. The horizontal walls 92 are disposed substantially horizontally with respect to the vehicle body 14, and the vehicle width direction outside end portions of the horizontal walls 92 are integrally connected to the inner walls 90. Further, the projecting sections of the front walls 86 and rear walls 88 are formed in triangular shapes as seen from the vehicle front-and-rear direction, and the vehicle width direction inside end portions of the projecting sections are made to serve as guide portions 94 obliquely inclined downward and outward in the vehicle width direction.

Figure 9:
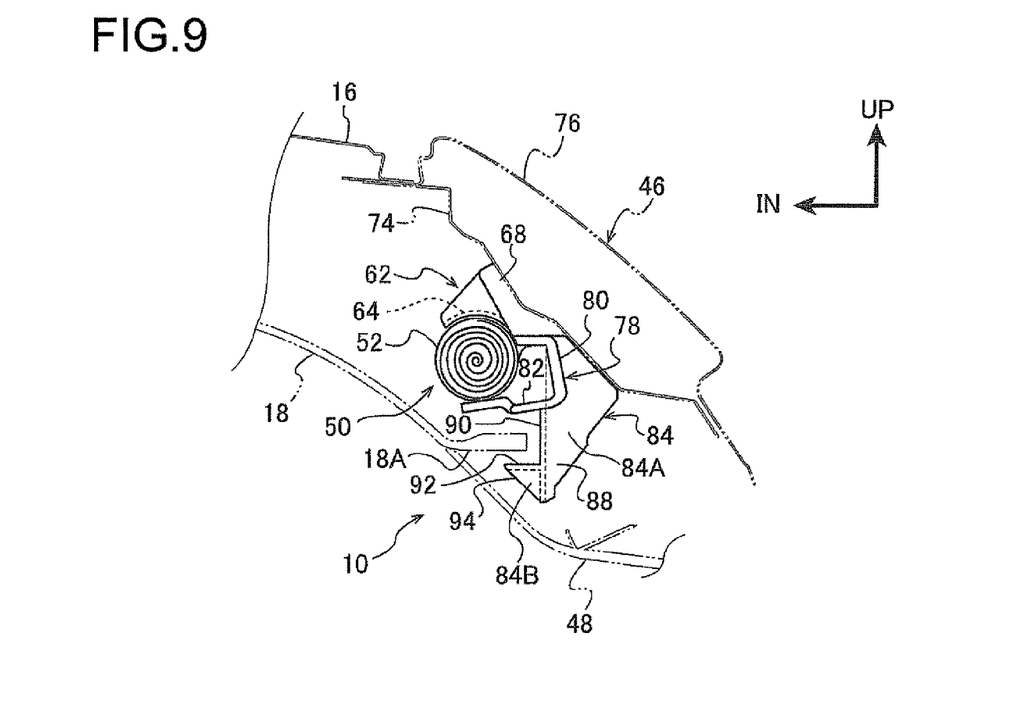
FIG. 9 is an enlarged longitudinal sectional view showing a cross section cut along line 9-9 of FIG. 4.

The receiving portions 84 correspond to engagement pieces 18A (see FIGS. 2, 3, 5 to 7, and 9) disposed on both vehicle width direction end portions of the vehicle rear side end portion of the roof headlining 18. As shown in FIG. 9, the engagement pieces 18A are formed as a result of the vehicle width direction end portions (portions in contact with roof side inner garnishes 48) of the roof headlining 18 partially extending (being lengthened) outward in the vehicle width direction. In FIG. 5 to FIG. 7, 18B denotes support pieces that support the middle portions of harnesses connected to the inflators, and 18C denotes looseness prevention pieces (not illustrated in FIG. 2) that prevent looseness of the rear end portions of the roof headlining 18.

Here, in the present embodiment, when the roof headlining 18 is to be installed in the vehicle body 14, first, the curtain airbag devices 50 are secured to the roof side rails 46 by the clips 71 and so forth. Thereafter, the roof headlining 18 is carried into the passenger compartment 20 via an open portion 96 in the front portion of the passenger compartment 20. Then, the roof headlining 18 is lifted upward inside the passenger compartment 20, whereby the engagement pieces 18A of the roof headlining 18 slide against the guide portions 94 of the provisional placement claws 84B. Because of this, the engagement pieces 18A are guided on the guide portions 94 and ride up onto the upper surfaces of the horizontal walls 92, whereby the rear end side of the roof headlining 18 is provisionally placed (supported) on the provisional placement claws 84B of the receiving portions 84. Thereafter, the clips 32, 36, and 40 on the front end side of the roof headlining 18 are pushed into and locked in the locking holes disposed in the roof 16 of the vehicle body 14, whereby the front end side of the roof headlining 18 is supported on the vehicle body 14. In this state, the roof headlining 18 is disposed substantially horizontally in the neighborhood below the normal installation position where the roof headlining 18 is installed in the vehicle body 14. In this state, the other clips 34, 38, and 42 are pushed into and locked in the locking holes in the roof 16 and the roof side rails 46, and sun visor brackets 23 and so forth are fastened to the roof 16 and the roof side rails 46 by fasteners (screws, bolts, etc.), whereby the roof headlining 18 is secured to the vehicle body 14.

Next, the action and effects of the present embodiment will be described.

In the present embodiment, the receiving portions 84 for provisionally placing the roof headlining 18 are disposed on the existing resin covers 62 covering the curtain airbags 52, so it is not necessary to dispose dedicated receiving portions. Because of this, an increase in cost can be suppressed. Moreover, the resin covers 62 are formed in long shapes along the roof side rails 46, so the degree of freedom of the setting positions of the receiving portions 84 disposed on the resin covers 62 can be improved. Because of this, workability when installing the roof headlining 18 in the vehicle body 14 can be improved.

That is, in the present embodiment, because the degree of freedom of the setting positions of the receiving portions 84 is improved as described above, the receiving portions 84 are disposed on the vehicle rear side end portions of the resin covers 62. Because of this, the engagement pieces 18A disposed on the rear end side of the roof headlining 18 can be provisionally placed on the receiving portions 84 disposed on the vehicle rear side end portions of the resin covers 62. In this state, when the front end side of the roof headlining 18 is locked to the vehicle body 14 by the clips 32, 36, and 40, the roof headlining 18 becomes supported substantially horizontally with respect to the vehicle body 14. Because of this, the work of attaching (the work of fastening) the sun visor brackets 23 and the assist grips 24 to the vehicle body 14 thereafter—that is, the work of securing the roof headlining 18 to the vehicle body 14 using these members—can be made easy.

Further, in the present embodiment, the receiving portions 84 of the resin covers 62 are disposed on the vehicle rear sides of the vehicle rear side end portions of the curtain airbags 52. For this reason, when the curtain airbags 52 inflate and deploy downward, the receiving portions 84 do not interfere with the curtain airbags 52, which is preferred. In other words, in a case where the receiving portions have been set in the regions of the cover bodies 64 of the resin covers 62 where the curtain airbags 52 are housed, restrictions arise on the shape of the receiving portions and the shape of the roof headlining 18 in order to prevent interference between the curtain airbags 52 and the receiving portions, but in the present embodiment, such restrictions can be avoided. Because of this, interference between the curtain airbags 52 and the receiving portions can be prevented while making workability when performing the work of provisionally placing the roof headlining 18 good.

Moreover, in the present embodiment, the receiving portions 84 of the resin covers 62 are disposed in proximity to the securing portions 68 for securing the resin covers 62 to the roof side rails 46. Because of this, when the roof headlining 18 has been provisionally placed on the receiving portions 84, the mass of the roof headlining 18 can be supported well by the roof side rails 46 while suppressing deformation of the resin covers 62.

Furthermore, in the present embodiment, as shown in FIG. 9, the receiving portions 84 extend downward from the vehicle width direction outside sections (the sections on the roof side rail 46 sides) of the cover bodies 64 of the resin covers 62. Additionally, the engagement pieces 18A (the vehicle width direction end portions) of the roof headlining 18 are provisionally placed on the upper surfaces of the horizontal walls 92 of the provisional placement claws 84B disposed on the lower end sides of the receiving portions 84. Because of this, spaces for disposing the receiving portions 84 can be easily ensured in the limited spaces between the roof side rails 46 and the roof headlining 18.

Further, in the present embodiment, the vehicle width direction outside end portions of the upper portions of the receiving portions 84 are in contact with the inner panels 74 of the roof side rails 46. Because of this, when the roof side rails 46 have been provisionally placed on the receiving portions 84, the receiving portions 84 can be prevented or suppressed from deforming toward the roof side rails 46. Consequently, by moderately weakening the receiving portions 84, it becomes possible to reduce the weight of the receiving portions 84.

Further, in the present embodiment, the vehicle width direction inside end portions of the provisional placement claws 84B disposed on the receiving portions 84 are made to serve as the guide portions 94 inclined upward and inward in the vehicle width direction. For this reason, when provisionally placing the roof headlining 18 on the upper surfaces of the horizontal walls 92 of the provisional placement claws 84B, the engagement pieces 18A of the roof headlining 18 can be guided to the upper surfaces of the provisional placement claws 84B by allowing the engagement pieces 18A to slide against the guide portions 94 (see FIGS. 3 and 4). That is, even if the direction in which the roof headlining 18 is lifted up varies somewhat, the lift-up direction of the roof headlining 18 can be guided by the guide portions 94, so the work of provisionally placing the roof headlining 18 can be made easy.

Moreover, in the above embodiment, the shelf-like reinforcement portions 78 are disposed on the vehicle rear side end portions of the resin covers 62, and the receiving portions 84 extend from the reinforcement portions 78, so the resin covers 62 can be prevented or effectively suppressed from deforming due to the load input from the roof headlining 18 to the receiving portions 84.

Further, in the above embodiment, the body portions 84A of the receiving portions 84 are formed in cross-sectional substantial U shapes whose vehicle width direction outer sides are open as seen from the vehicle up-and-down direction, so a balance between reducing the weight of the receiving portions 84 and ensuring the stiffness of the receiving portions 84 can be achieved.

<Supplemental Description of the Embodiment>

The above embodiment was given a configuration in which the receiving portions 84 were disposed in proximity to the vehicle rear sides of the securing portions 68, but the embodiment is not limited to this and may also be given a configuration in which the receiving portions 84 are disposed below the securing portions 68. Because of this, deformation of the resin covers 62 when the roof headlining 18 has been provisionally placed on the receiving portions 84 can be kept to a minimum, so by moderately weakening the sections of the resin covers 62 between the receiving portions 84 and the securing portions 68, the weight of the resin covers 62 can be reduced.

Further, the above embodiment was given a configuration in which the vehicle width direction inside end portions of the provisional placement claws 84B were made to serve as the guide portions 94 obliquely inclined downward and outward in the vehicle width direction, but the embodiment is not limited to this and may also be given a configuration in which the guide portions 94 are omitted. That is, the embodiment may also be given a configuration in which the vehicle width direction inside end portions of the provisional placement claws 84B are formed substantially along the vehicle up-and-down direction.

Further, the above embodiment was given a configuration in which the vehicle width direction outside end portions of the receiving portions 84 were in contact with the inner panels 74 of the roof side rails 46, but the embodiment is not limited to this and may also be given a configuration in which the receiving portions 84 are disposed away from the inner panels 74.

Moreover, the above embodiment was given a configuration in which the receiving portions 84 extended downward from the vehicle width direction outside end portions of the reinforcement portions 78 configuring part of the cover bodies 64, but the embodiment is not limited to this, and the direction in which the receiving portions 84 extend can be appropriately changed.

Further, the above embodiment was given a configuration in which the provisional placement claws 84B projecting inward in the vehicle width direction were disposed on the lower end portions of the receiving portions 84 and the engagement pieces 18A (the vehicle width direction end portions) of the roof headlining 18 were provisionally placed on the upper surfaces of the provisional placement claws 84B, but the embodiment is not limited to this and may also be given a configuration in which the provisional placement claws 84B are omitted. In this case, for example, the embodiment may be given a configuration in which recessed portions are formed on the lower end sides of the receiving portions 84 and the vehicle width direction end portions of the roof headlining 18 are inserted and provisionally placed in the recessed portions.

Further, the above embodiment was given a configuration in which the reinforcement portions 78 were disposed on the vehicle rear side end portions of the cover bodies 64, but the embodiment is not limited to this and may also be given a configuration in which the reinforcement portions 78 are omitted.

Moreover, the above embodiment was given a configuration in which the receiving portions 84 were disposed in proximity to the securing portions 68 for securing the resin covers 62 to the roof side rails 46, but the embodiment is not limited to this and may also be given a configuration in which the receiving portions 84 are disposed away from the securing portions 68.

Further, the above embodiment was given a configuration in which the receiving portions 84 were disposed on the vehicle rear sides of the vehicle rear side end portions of the curtain airbags 52 in the folded state on the vehicle rear side end portions of the resin covers 62, but the embodiment is not limited to this, and where the receiving portions 84 are disposed on the resin covers 62 can be appropriately changed. However, even in this case, it is preferred that the receiving portions 84 be disposed in the regions of the cover bodies 64 where the curtain airbags 52 are not housed.

In addition, the present invention can be changed and implemented in a variety of ways without departing from the gist thereof. Further, it goes without saying that the scope of rights of the present invention is not limited to the above embodiment.

The invention claimed is:

1. An automobile ceiling material provisional placement structure comprising:
   a ceiling material that configures a lining of a ceiling of a passenger compartment;
   curtain airbags that are disposed between roof side rails of a vehicle body and the ceiling material in a state in which the curtain airbags are folded in long shapes along the roof side rails, with the curtain airbags inflating upon being supplied with gas generated by inflators, whereby the curtain airbags deploy downward while bending vehicle width direction end sides of the ceiling material; and
   resin covers that are formed in long shapes along the roof side rails, are disposed between the roof side rails and the curtain airbags, cover the curtain airbags in the folded state from the roof side rail sides, and have disposed thereon receiving portions arranged to provisionally support vehicle width direction end portions of the ceiling material by contacting the ceiling material when the ceiling material is installed in the vehicle body,
   the receiving portions being disposed on vehicle rear side end portions of the resin covers and being disposed on vehicle rear sides of vehicle rear side end portions of the curtain airbags in the folded state.

2. The automobile ceiling material provisional placement structure according to claim 1, wherein
   the receiving portions are disposed in proximity to securing portions for securing the resin covers to the roof side rails.

3. The automobile ceiling material provisional placement structure according to claim 2, wherein
   the receiving portions are disposed below the securing portions.

4. The automobile ceiling material provisional placement structure according to claim 1, wherein
   the receiving portions extend downward from vehicle width direction outside sections of cover bodies of the resin covers covering the curtain airbags, provisional placement claws projecting inward in the vehicle width direction are disposed on lower end sides of the receiving portions, and the vehicle width direction end portions of the ceiling material are provisionally placed on upper surfaces of the provisional placement claws.

5. The automobile ceiling material provisional placement structure according to claim 4, wherein
   vehicle width direction inside end portions of the provisional placement claws are made to serve as guide portions obliquely inclined downward and outward in the vehicle width direction.

6. The automobile ceiling material provisional placement structure according to claim 1, wherein
   vehicle width direction outside end portions of the receiving portions are in contact with the roof side rails.

7. An automobile ceiling material installation method comprising:
   attaching resin covers, which cover curtain airbags folded in long shapes from roof side rail sides of a vehicle body and are formed in long shapes along the roof side rails, to the roof side rails;
   thereafter provisionally placing vehicle width direction end portions of a ceiling material of a passenger compartment on receiving portions disposed on the resin covers, the receiving portions provisionally supporting the vehicle width direction end portions of the ceiling material by contacting the ceiling material; and
   securing the ceiling material to a vehicle body via plural vehicular parts including sun visor brackets and assist grips in the provisionally placed state.

\* \* \* \* \*